US012726776B2

(12) United States Patent
Waldmann

(10) Patent No.: US 12,726,776 B2
(45) Date of Patent: Sep. 1, 2026

(54) INTRAOPERATIVE VIBRATIONAL FEEDBACK ASSESSMENT

(71) Applicant: Cochlear Limited, Macquarie University (AU)

(72) Inventor: Bernd Waldmann, Hannover (DE)

(73) Assignee: Cochlear Limited

( * ) Notice: Subject to any disclaimer, the term of this patent is extended or adjusted under 35 U.S.C. 154(b) by 993 days.

(21) Appl. No.: 17/912,663

(22) PCT Filed: Feb. 16, 2021

(86) PCT No.: PCT/IB2021/051300
§ 371 (c)(1),
(2) Date: Sep. 19, 2022

(87) PCT Pub. No.: WO2021/191699
PCT Pub. Date: Sep. 30, 2021

(65) Prior Publication Data
US 2023/0164500 A1 May 25, 2023

Related U.S. Application Data

(60) Provisional application No. 62/993,918, filed on Mar. 24, 2020.

(51) Int. Cl.
*H04R 25/00* (2006.01)

(52) U.S. Cl.
CPC ......... *H04R 25/606* (2013.01); *H04R 25/305* (2013.01); *H04R 25/554* (2013.01); (Continued)

(58) Field of Classification Search
None
See application file for complete search history.

(56) References Cited

U.S. PATENT DOCUMENTS 6,134,329 A * 10/2000 Gao ........................ H04R 25/70 381/60
7,010,135 B2 3/2006 Von Buol
(Continued)

FOREIGN PATENT DOCUMENTS

WO 2005048646 A2 5/2005
WO 2007-001989 A2 6/2006
(Continued)

OTHER PUBLICATIONS

International Search Report and Written Opinion in counterpart International Application No. PCT/IB2021/051300, mailed May 12, 2021, 10 pages.
(Continued)

*Primary Examiner* — Thaddeus B Cox
(74) *Attorney, Agent, or Firm* — Edell, Shapiro & Finnan, LLC

(57) ABSTRACT

Presented herein are techniques for generating information characterizing an amount of vibration isolation between an implantable vibration sensor and an implantable mechanical actuator (actuator), when each are implanted in a recipient. In particular, the implantable mechanical actuator is configured to generate and deliver, based on one or more actuator control signals, mechanical stimulation signals to the recipient. The vibration sensor is configured to capture vibrations induced by the delivery of the mechanical stimulation signals to the recipient. A vibrational transfer function relating a position of the vibration sensor to the actuator is then generated based on the captured vibrations and the attributes of the actuator control signals. The vibrational transfer function provides an indication of the vibration isolation present between the vibration sensor and the actuator, at their respective locations within the recipient.

22 Claims, 12 Drawing Sheets

(52) U.S. Cl.
CPC ........... *H04R 25/558* (2013.01); *H04R 25/65* (2013.01); *H04R 2225/55* (2013.01); *H04R 2225/67* (2013.01)

(56) References Cited

U.S. PATENT DOCUMENTS

| | | | | |
|---|---|---|---|---|
| 7,186,211 | B2 | 3/2007 | Schneider et al. | |
| 7,214,179 | B2 | 5/2007 | Miller, III et al. | |
| 7,241,258 | B2 | 7/2007 | Miller, III et al. | |
| 7,536,022 | B2 | 5/2009 | Von Buol | |
| 7,556,597 | B2 | 7/2009 | Miller, III et al. | |
| 8,582,793 | B2 | 11/2013 | Baechler et al. | |
| 2001/0014818 | A1 | 8/2001 | Kennedy | |
| 2005/0096561 | A1 | 5/2005 | Conn et al. | |
| 2005/0197524 | A1 | 9/2005 | Miller et al. | |
| 2006/0247488 | A1* | 11/2006 | Waldmann ............. | H04R 25/30 600/25 |
| 2008/0260171 | A1* | 10/2008 | Nordahn ................ | H04R 25/70 381/60 |
| 2011/0319703 | A1 | 12/2011 | Wiskerke et al. | |
| 2012/0136197 | A1 | 5/2012 | Van Gerwen | |
| 2013/0245362 | A1 | 9/2013 | Elofsson | |
| 2014/0270291 | A1 | 9/2014 | Flynn et al. | |
| 2016/0345107 | A1 | 11/2016 | Van Dijk et al. | |
| 2017/0180895 | A1 | 6/2017 | Flynn et al. | |
| 2018/0333577 | A1 | 11/2018 | Nygard et al. | |
| 2020/0029865 | A1 | 1/2020 | Koike et al. | |

FOREIGN PATENT DOCUMENTS

| | | | |
|---|---|---|---|
| WO | 2012160542 | A2 | 11/2012 |
| WO | 2018103899 | A1 | 6/2018 |
| WO | 2019-102266 | A1 | 5/2019 |

OTHER PUBLICATIONS

Lefebvre, Philippe P. et al., "A Retrospective Multicentre Cohort Review of Patient Characteristics and Surgical Aspects versus the Long-Term Outcomes for Recipients of a Fully Implantable Active Middle Ear Implant", Audiol Neurotol 2016;21:333-345, DOI: 10.1159/000454666, 13 pages.

Devèze, Arnaud et al., "Automatic Feedback Canceler—Preliminary Clinical and Experimental Data", Sep. 2018, 20 pages.

Waldmann, Bernd, "Clinical guidance for successful outcomes with the Cochlear Carina System", Cochlear™ Carina® System, D1416842-1, Jun. 2018, 3 pages.

* cited by examiner

575

INTRAOPERATIVE VIBRATIONAL FEEDBACK ASSESSMENT

BACKGROUND

Field of the Invention

The present invention relates generally to assessment of intraoperative vibrational feedback at an implantable sound input module.

Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In one aspect, a method is provided. The method comprises: delivering one or more sets of mechanical stimulation signals to a recipient via an actuator of an implantable auditory prosthesis; capturing, at a vibration sensor positioned at a first location in the recipient, vibrations induced by each of the one or more sets of the mechanical stimulation signals; determining a vibrational transfer function between the actuator and the vibration sensor at the first location; and providing a user with an indication of the vibrational transfer function between the actuator and the vibration sensor at the first location.

In another aspect, a method is provided. The method comprises: positioning a sound input module comprising a sound sensor and a vibration sensor at a first location in a recipient; driving an actuator implanted in the recipient with one or more sets of actuator control signals, where each of the one or more sets of actuator control signals cause the actuator to deliver one or more mechanical stimulation signals to the recipient; capturing, at the vibration sensor, vibrations induced by each of the one or more sets of the mechanical stimulation signals; and analyzing attributes of the one or more sets of one or more sets of control signals relative to attributes of the vibrations induced by each of the one or more sets of the mechanical stimulation signals to evaluate a suitability of the first location for implantation of the sound input module at the first location.

In another aspect, one or more non-transitory computer readable storage media are provided. The non-transitory computer readable storage media comprise instructions that, when executed by a processor, cause the processor to: generate one or more sets of actuator control signals at an implantable auditory prosthesis, wherein the implantable auditory prosthesis comprises an actuator and an sound input module each configured to be implanted in a recipient, wherein the sound input module comprises a sound sensor and a vibration sensor; provide the one or more sets of actuator control signals to the actuator to deliver, with the actuator, one or more sets of mechanical stimulation signals to the recipient, wherein each of the one or more sets of mechanical stimulation signals are generated based on at least one of the one or more sets of the actuator control signals; receive, from the vibration sensor, one or more sets of output signals indicating vibrations detected at the vibration sensor in response to each of the one or more sets of mechanical stimulation signals; and generate, based on the one or more sets of actuator control signals and the one or more sets of output signals indicating accelerations detected at the acceleration sensor, an indication of a relative vibration isolation between the acceleration sensor and the actuator.

In another aspect, a system is provided. The system comprises: an actuator configured to be implanted in a recipient and to generate one or more sets of mechanical stimulation signals for delivery to a recipient; a vibration sensor configured to be implanted at a first location in the recipient and configured to capture vibrations induced by each of the one or more sets of the mechanical stimulation signals; and one or more processors configured to: generate, based at least on the vibrations induced by each of the one or more sets of the mechanical stimulation signals, a vibrational transfer function between the actuator and the vibration sensor at the first location.

BRIEF DESCRIPTION OF THE DRAWINGS

Embodiments of the present invention are described herein in conjunction with the accompanying drawings, in which.

DETAILED DESCRIPTION

Presented herein are techniques for generating information characterizing an amount of vibration isolation between an implantable vibration sensor and an implantable mechanical actuator (actuator), when each are implanted in a recipient. In particular, the implantable mechanical actuator is configured to generate and deliver, based on one or more actuator control signals, mechanical stimulation signals to the recipient. The vibration sensor is configured to capture vibrations induced by the delivery of the mechanical stimulation signals to the recipient. A vibrational transfer function relating a position of the vibration sensor to the actuator is then generated based on the captured vibrations and the attributes of the actuator control signals. The vibrational transfer function provides an indication of the vibration isolation present between the vibration sensor and the actuator, at their respective locations within the recipient.

Merely for ease of description, the techniques presented herein are primarily described herein with reference to a totally implantable middle ear auditory prostheses (middle ear implant). However, it is to be appreciated that the techniques presented herein may also be incorporated into, or performed by, a variety of other implantable medical devices. For example, the techniques presented herein may be used with other auditory prostheses, including cochlear implants, bone conduction devices, direct acoustic stimulators, auditory brain stimulators, etc. The techniques presented herein may also be used with vestibular devices (e.g., vestibular implants), visual devices (i.e., bionic eyes), sensors, pacemakers, drug delivery systems, defibrillators, functional electrical stimulation devices, catheters, seizure devices (e.g., devices for monitoring and/or treating epileptic events), sleep apnea devices, electroporation devices, etc.

Figure 1A:
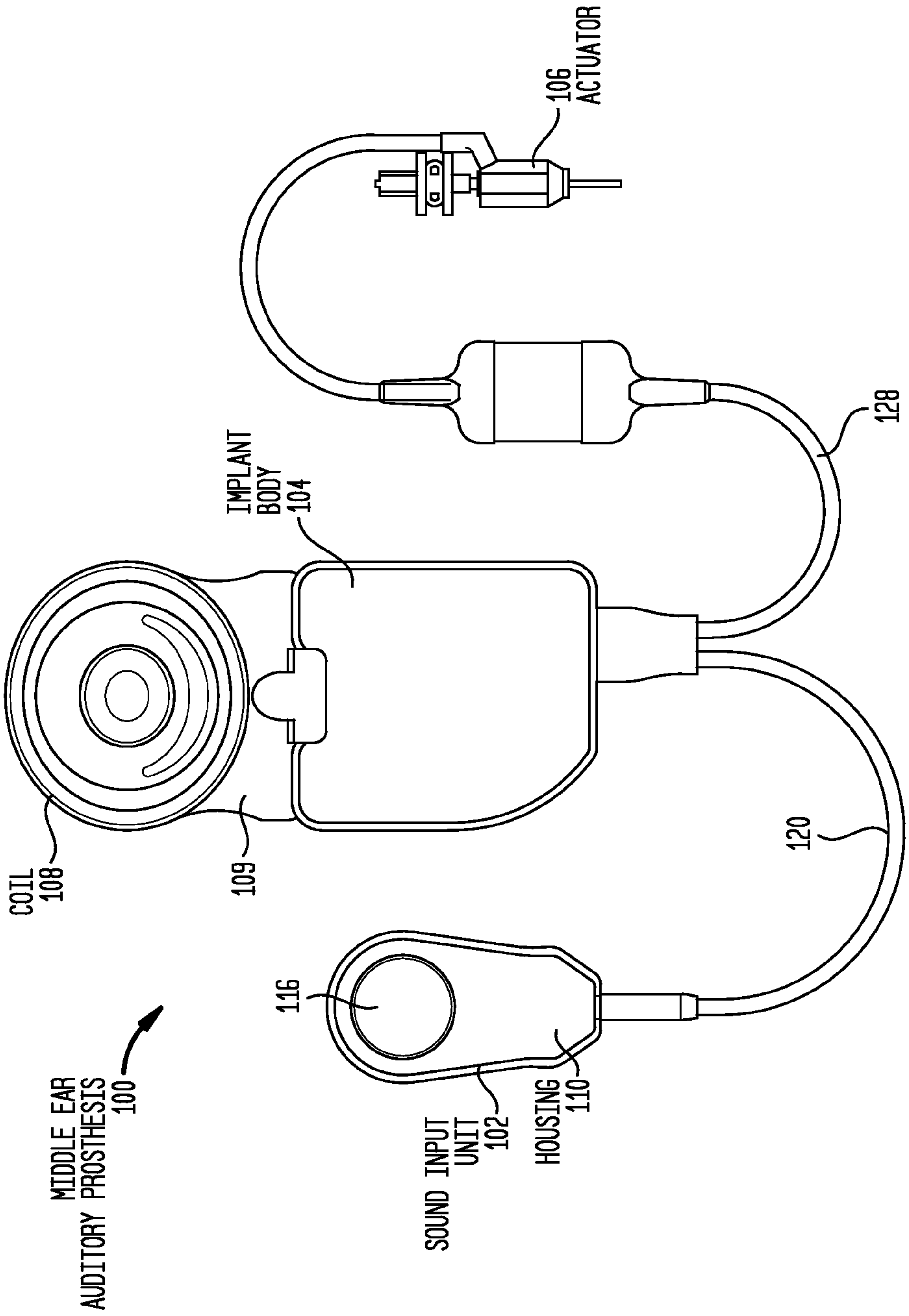
FIG. 1A is a top view of a totally implantable middle ear auditory prosthesis, in accordance with certain embodiments presented herein.
Figure 1B:
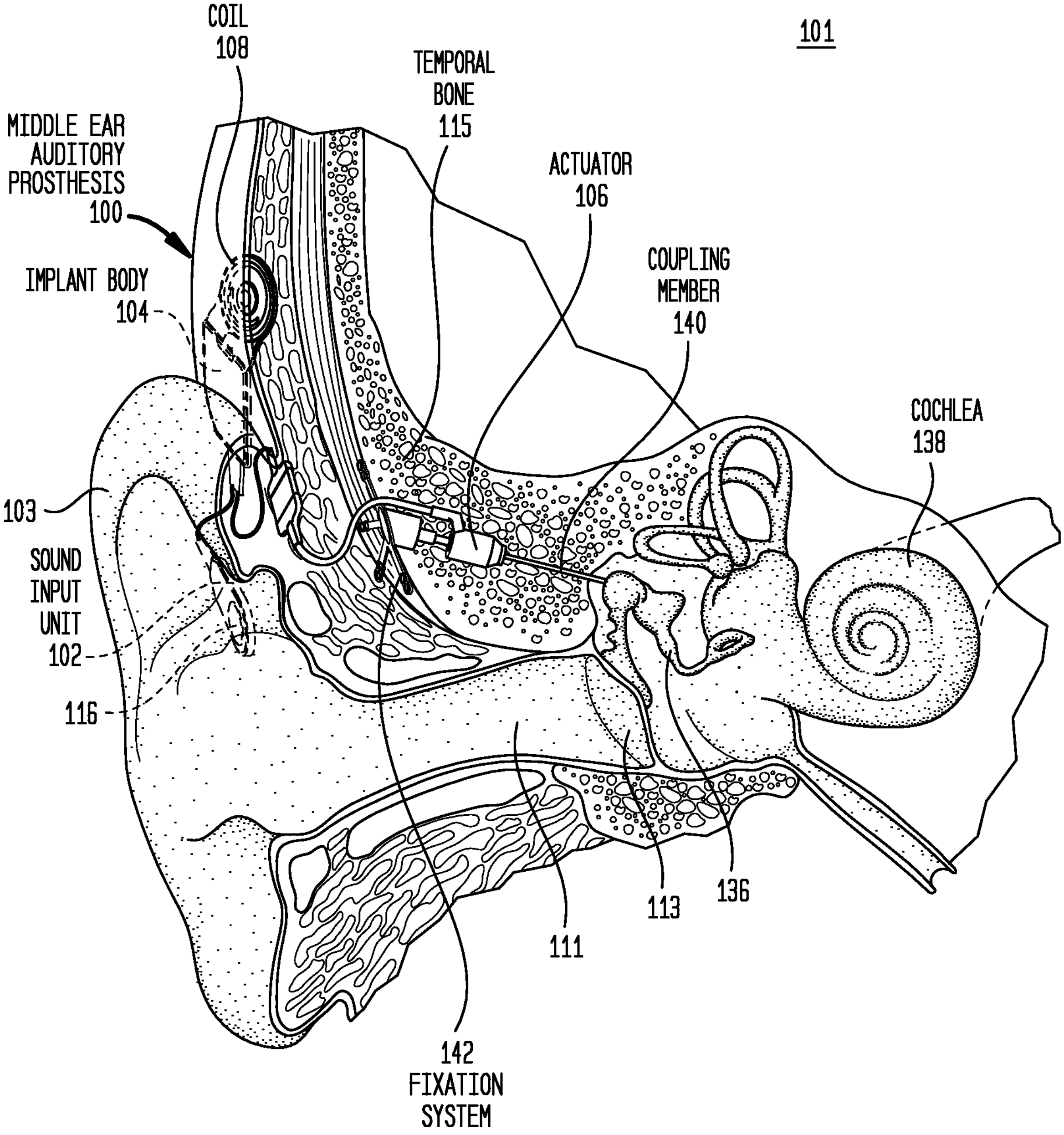
FIG. 1B is a schematic diagram illustrating the totally implantable middle ear auditory prosthesis of FIG. 1A implanted within the head of a recipient, in accordance with certain embodiments presented herein.
Figure 1C:
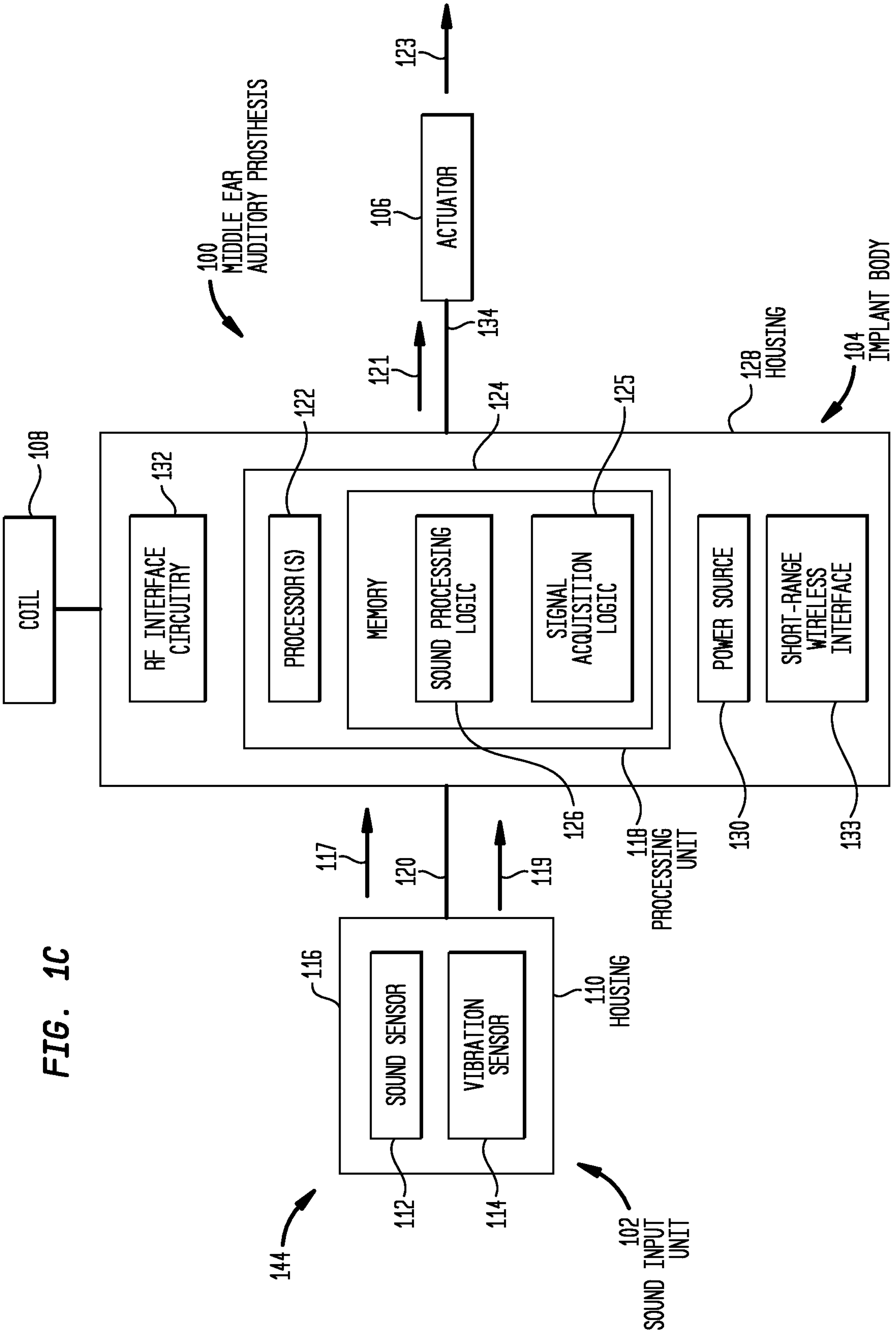
FIG. 1C is a functional block diagram of the totally implantable middle ear auditory prosthesis of FIG. 1A, in accordance with certain embodiments presented herein.

FIG. 1A is a top view of a totally implantable middle ear auditory prosthesis 100, in accordance with certain embodiments presented herein. FIG. 1B is schematic diagram illustrating the middle ear auditory prosthesis 100 of FIG. 1A implanted in a recipient 10, while FIG. 1C is a schematic block diagram of the middle ear auditory prosthesis 100. For ease of description, FIGS. 1A-1C will be described together.

The middle ear auditory prosthesis 100 of FIGS. 1A-1C comprises a sound input unit 102, an implant body 104, an actuator 106, and a coil 108, all implanted under the skin/tissue of the recipient 101. The sound input unit 102 comprises a substantially rigid housing 110, in which at least two implantable sensors 112 and 114 are disposed/positioned. The implantable sensor 112 is configured/designed to pick-up (capture) external acoustic sounds, while implantable sensor 114 is configured/designed to pick-up (capture) vibration caused, for example, by body noises. That is, the implantable sensor 112 is a "sound" sensor/transducer that is primarily configured to detect/receive external acoustic sounds, such as an implantable microphone, while the implantable sensor 114 is a "vibration" sensor that is primarily configured to detect/receive internal body noises and vibrations (e.g., vibrations caused by the action of an implantable actuator). The sound sensor 112 and the vibration sensor 114 are sometimes collectively referred to herein as "implantable sensors" 144.

In general, the vibration sensor 114 is mechanically attached to the housing 110 such that body noises (vibrations) passed to the housing can be detected/captured by the vibration sensor (e.g., sense vibrations of the housing). The housing 110 is hermetically sealed and includes a diaphragm 116 that is proximate to the sound sensor 112. The diaphragm 116 may be unitary with the housing 116 and/or may be a separate element that is attached (e.g., welded) to the housing 112. The sound input unit 102 is configured to be implanted within the recipient 101. In one example shown in FIG. 1B, the sound input unit 102 is configured to be implanted within the skin/tissue adjacent to the outer ear 103 of the recipient. In this position, the diaphragm 116 is below the skin of the recipient that is close to the recipient's ear canal 105. In operation, sound signals that impinge on the skin adjacent to (i.e., on top of) the diaphragm 116 cause the skin adjacent the diaphragm 116, and thus the diaphragm 116 itself, to be displaced (vibrate) in response to the sound signals. The displacement of the diaphragm 116 is detected by the sound sensor 112. In this way, the sound sensor 112, although implanted within the recipient, is able to detect external acoustic sound signals (external acoustic sounds).

The implantable sound sensor 112 and the vibration sensor 114 may each be electrically connected to the implant body 104. In operation, the sound sensor 112 and the vibration sensor 114 detect input signals (e.g., external acoustic sounds and/or vibrations) and convert the detected input signals into electrical signals that are provided to the processing unit 118 (e.g., via lead 120). In FIG. 1C, arrow 117 represents the electrical output of the sound sensor 112, sometimes referred to herein as "sound sensor output signals." Additionally, arrow 119 in FIG. 1C represents the electrical output of the vibration sensor 114, sometimes referred to herein as "vibration sensor output signals." Stated differently, the sound sensor 112 provides sound sensor output signals 117 to the processing unit 118, while the vibration sensor 114 provides vibration sensor output signals 119 to the processing unit 118. The processing unit 118 is configured to generate stimulation control signals 121 (FIG. 1C) based at least on the external acoustic sounds and/or the vibrations detected by the sound sensor 112 and/or the vibration sensor 114, respectively.

In the example of FIG. 1B, the processing unit 118 comprises at least one processor 122 and memory 124. The memory 124 includes sound processing logic 126 and signal acquisition logic 125. When the sound processing logic 126 is executed by the at least one processor 122, the sound processing logic 126 causes the at least one processor 122 to perform sound processing operations described herein (e.g., convert external acoustic sounds and/or the body noises detected by the sound sensor 112 and/or the vibration sensor 114 into stimulation control signals 121). When the signal acquisition logic 125 is executed by the at least one processor 122, the signal acquisition logic 125 causes the at least one processor 122 to perform the signal acquisition operations described herein. For example, in certain embodiments, the signal acquisition operations include the performance of open-loop or closed-loop measurements, as described elsewhere herein, to capture vibrational feedback data for use in generating a location-dependent transfer function for the vibration sensor 114. In certain embodiments, the signal acquisition operations include, in addition to performance of the open-loop or closed-loop measurements, the determination of location-dependent vibrational transfer function. The signal acquisition operations also include sending of the vibrational feedback data and/or the location-dependent vibrational transfer function to an external device. Further details regarding the signal acquisition operations are provided below.

Memory 124 may comprise any suitable volatile or non-volatile computer readable storage media including, for example, random access memory (RAM), cache memory, persistent storage (e.g., semiconductor storage device, read-only memory (ROM), erasable programmable read-only memory (EPROM), flash memory, etc.), or any other computer readable storage media that is capable of storing program instructions or digital information. The processing unit 118 may be implemented, for example, on one or more printed circuit boards (PCBs).

It is to be appreciated that the arrangement for processing unit 118 in FIG. 1C is merely illustrative and that the techniques presented herein may be implemented with a number of different processing arrangements. For example, the sound processing unit 118 may be implemented with processing units formed by any of, or a combination of, one or more processors (e.g., one or more Digital Signal Processors (DSPs), one or more uC cores, etc.), firmware, software, etc. arranged to perform, for example, the operations described herein.

As shown, the implant body 114 includes a hermetically sealed housing 128 in which the processing unit 118 is disposed. Also disposed in the housing 128 is a power source (e.g., rechargeable battery) 130 and a radio-frequency (RF) interface circuitry 132. Electrically connected to the RF interface circuitry 132 is the implantable coil 108, which is disposed outside of the housing 128. In general, the implantable coil 108 and the RF interface circuitry 132 enable the receipt of power and data from an external device (not shown in FIGS. 1A-1C) and the transfer of data to an external device. However, it is to be appreciated that various types of energy transfer may be used to transfer power and/or data from an external device and, as such, FIG. 1B illustrates only one example arrangement.

As noted, the RF interface circuitry 132 and the implantable coil 108 enable the middle ear auditory prosthesis 100 to receive data/power from and/or transfer data to, an external device. That is, modulated signals transmitted bi-directionally through the inductive link (RF coil 108 and an external) are used to support battery charging, device programming, status queries and user remote control.

In certain examples, the external device may comprise an off-the-ear (OTE) unit. In other examples, the external device may comprise a behind-the-ear ear (BTE) unit or a micro-BTE unit, configured to be worn adjacent to the recipient's outer ear. Alternative external devices could comprise a device worn in the recipient's ear canal, a body-worn processor, a fitting system, a computing device, a consumer electronic device (e.g., mobile phone communication), etc. For example, as described further below, during surgery, the middle ear prosthesis 100 is configured to be in communication with a computing device to display an indication of a location-dependent transfer function to a user (e.g., surgeon).

FIG. 1C has been described with reference to use of the RF interface circuitry 132 and the implantable coil 108 for communication with an external device. However, in in certain embodiments, the implant body 104 may also include a short-range wireless interface 133 for communication with external devices. The short-range wireless interface 133 may be, for example, a Bluetooth® interface, Bluetooth® Low Energy (BLE) interface, or other interface making use of any number of standard or proprietary protocols. Bluetooth® is a registered trademark owned by the Bluetooth® SIG.

As noted above, the processing unit 118 generates stimulation control signals 121. The stimulation control signals 121 are provided to the actuator 106 (e.g., via lead 134) for use in delivering mechanical stimulation signals to the recipient. In FIG. 1C, the mechanical stimulation signals (vibration signals or vibration) delivered to the recipient are represented by arrow 123.

In the example of FIG. 1B, the actuator 106 delivers the vibration 123 to the recipient via the ossicular chain (ossicles) 136 (i.e., the bones of the middle ear, which comprise the malleus, the incus and the stapes). The ossicles 136 are positioned in the middle ear cavity 113 and are mechanically coupled between the tympanic membrane 113 and the oval window (not shown) of cochlea 138. In natural hearing, the ossicles 136 serve to filter and amplify sound waves received via the recipient's ear canal 111.

Figure 1D:
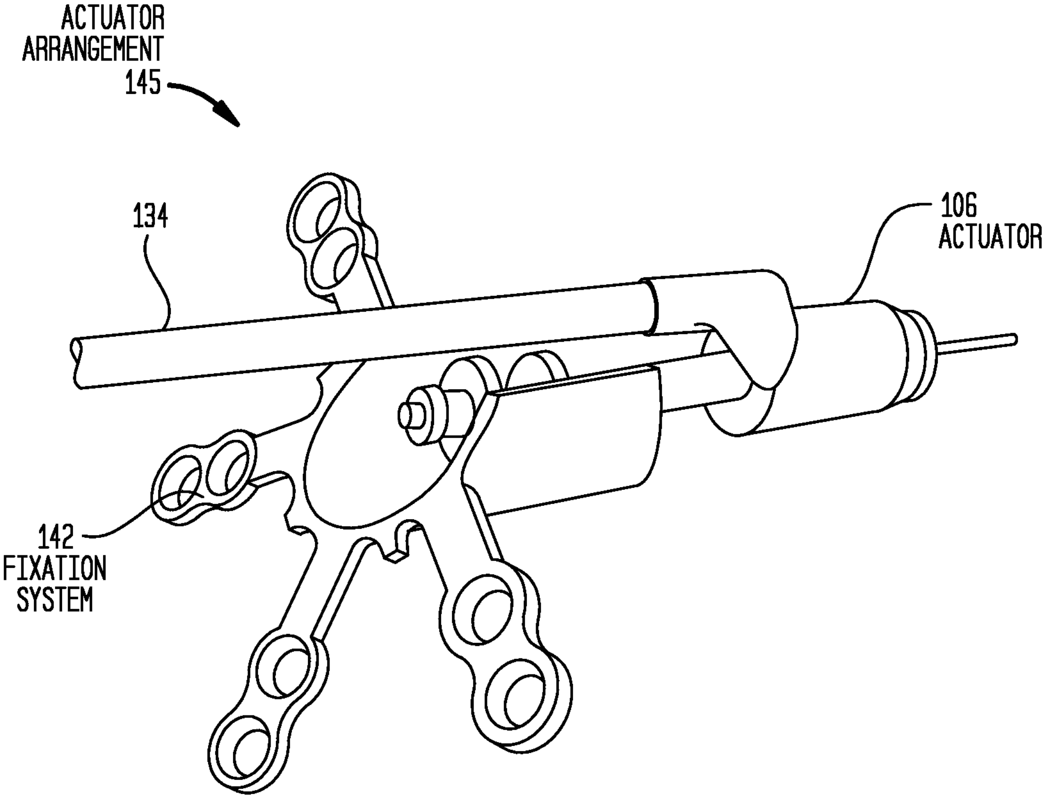
FIG. 1D is a perspective view of an actuator of the totally implantable middle ear auditory prosthesis of FIG. 1A and a fixation system, in accordance with certain embodiments presented herein.
Figure 1E:
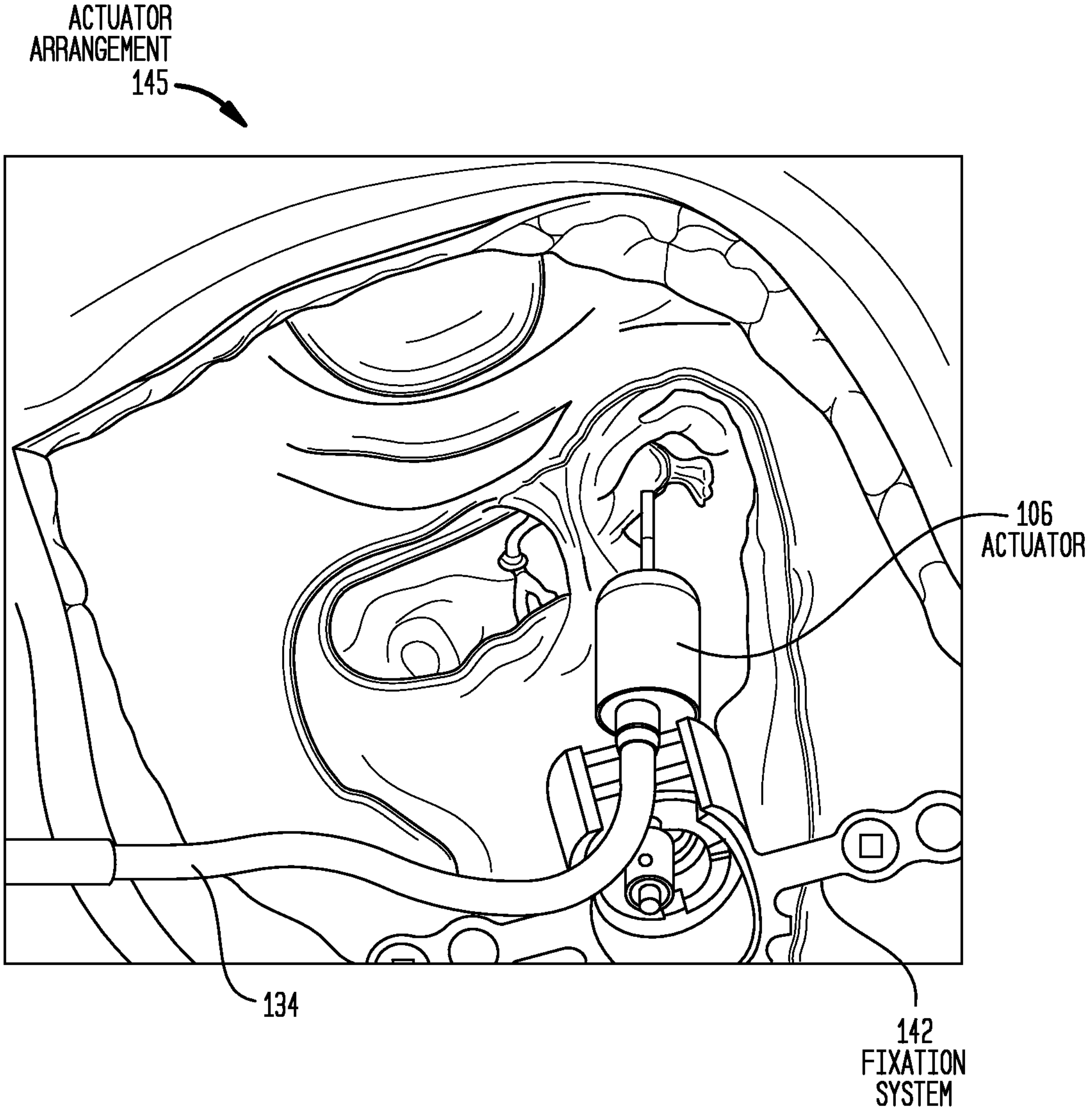
FIG. 1E is another perspective view of the actuator and fixation system of FIG. 1D, in accordance with certain embodiments presented herein.

As shown in FIG. 1B, the actuator 106 is configured to be implanted in the recipient so as to impart motion to (e.g., vibrate) the ossicles 136 or the cochlea fluid directly via, for example, the oval window, the round window, a cochleostomy, etc., In FIG. 1B, the actuator 106 attached to the bone 115 of the recipient via a fixation system 142 (also shown in more detail in FIGS. 1D and 1E). In addition, the actuator 106 is mechanically coupled to the ossicles 136 (e.g., the incus) via a coupling member 140, which may be part of the actuator 106 and/or a separate element attached to the actuator. The actuator 106 and the fixation system 142 are sometimes collectively referred to herein as an "actuator arrangement" 145.

In operation, the actuator 106 is configured to generate vibration 123 based on the stimulation control signals 121 received from the processing unit 118. Since, as noted, the ossicles 136 are coupled to the oval window (not shown) of cochlea 138, vibration imparted to the ossicles 136 by the actuator 106 will, in turn, cause oval window to articulate (vibrate) in response thereto. Similar to the case with normal hearing, this vibration of the oval window sets up waves of fluid motion of the perilymph within cochlea 138 which, in turn, activates the hair cells inside of the cochlea 138. Activation of the hair cells causes appropriate nerve impulses to be generated and transferred through the spiral ganglion cells (not shown) and auditory nerve (not shown) to the brain (also not shown), where they are perceived as sounds.

It is to be appreciated that the arrangement shown in FIG. 1B in which the actuator 106 is mechanically coupled to the ossicles 136 is merely illustrative and that the techniques presented herein may be used with different mechanical stimulation arrangements. For example, in alternative embodiments, the actuator 106 could be coupled directly to the oval window, another opening in the cochlea 138 (e.g., a cochleostomy or the round window), an opening in the recipient's semicircular canals, the recipient's skull bone, etc.

The middle ear auditory prosthesis 100 of FIGS. 1A-1E is sometimes referred to as a "totally implantable middle ear auditory prosthesis" because all components of the prosthesis are configured to be implanted under skin/tissue of a recipient. Because all components of the middle ear auditory prosthesis 100 are implantable, the middle ear auditory prosthesis operates, for at least a finite period of time, without the need of an external device. However, as noted, an external device can be used to, for example, are to support battery charging, device programming, status queries, user remote control, etc. of the middle ear auditory prosthesis 100.

With a fully implantable middle ear auditory prosthesis, such as prosthesis 100, there is a potential vibrational feedback pathway where vibration is transmitted from the implanted actuator 106 to the implantable sensors 144. This vibrational feedback (i.e., a portion of the vibration delivered to the recipient) may limit a gain available for use in delivering the mechanical stimulation signals (vibration) to the recipient. In particular, the vibrational feedback could interfere with operation of the sound sensor 112 and, potentially, limit the gain that could be used to generate the mechanical stimulation signals. However, the vibrational feedback can be significantly reduced or substantially eliminated through appropriate placement of the implantable sensors 144 relative to the actuator 106. In particular, the sound sensor 112 should be implanted at a location such that the vibrational feedback captured/received by the sound sensor 112 is below a threshold level.

More specifically, as noted above, the actuator 106 is configured to deliver mechanical stimulation signals (vibration) 123 to the recipient. Although the actuator 106 is configured to deliver the mechanical stimulation signals 123 to the recipient via the ossicles, cochlea, etc., the mechanical stimulation signals may also be partially imparted to other internal structures, such as the recipient's skull bone, via the fixation system 142 (which itself is mechanical secured to the skull bone). Depending on the implanted location of the sound sensor 112, there may be a physical pathway (e.g., formed by bones, cartilage, implanted components, or other internal structures) that enables a portion of the mechanical stimulation signals generated by the actuator 106, and imparted to the recipient's skull bone or other internal structure(s), to reach the housing 110 of the sound input unit 102 and, in turn, reach the sound sensor 112 within the housing 110. This portion of the mechanical stimulation signals that passes to the sound sensor 112 is sometimes referred to herein as "vibrational feedback.". The physical pathway that enables the vibrational feedback to reach the sound sensor 112 is sometimes to herein as a "vibrational feedback path."

A particularly problematic situation occurs when, following implantation, there is physical contact between the housing 110 of the sound input unit 102 and actuator arrangement 145, which creates what is referred to herein as a "direct" vibrational feedback path between the sound sensor 112 and the actuator 106. If such a direct vibrational feedback path is present, when the actuator 106 delivers mechanical stimulation signals to the recipient, a portion of those mechanical stimulation signals are channeled directly to the housing 110 and the sound sensor 112.

A recipient's specific anatomical structure/situation, surgical access, etc. may limit what a surgeon is able to see during the surgical implantation. As such, avoiding direct contact between the housing 110 and the actuator arrangement 145 (i.e., actuator 106 and/or the actuator fixation system 142) may not be as a simple as performing an in-situ visual inspection during the surgery. For example, a surgeon could perform the surgery and believe, with his/her limited visibility, that there is a physical separation between the housing 110 of sound input unit 102 and actuator arrangement 145 when in fact the housing 110 and actuator arrangement 145 are still in direct contact with one another.

Moreover, each recipient has different physical characteristics (e.g., bone density at certain locations) that could affect the amount of vibrational feedback that reaches the sound sensor 112 at different locations in the recipient. That is, the sound sensor 112 may, at certain locations, due to the physical characteristics of the specific recipient, be less vibrationally sensitive to the mechanical stimulation signals generated by the actuator 106 than at other locations. Therefore, the sound sensor 112 may be affected by the vibrational feedback differently at different implanted locations.

As noted above, vibrational feedback that reaches the sound sensor 112, as a result of operation of the implanted actuator 106, may limit the gain available for use in delivering the mechanical stimulation signals to the recipient. Also as noted above, the vibrational feedback that reaches the sound sensor 112, as a result of operation of the implanted actuator 106, is a function of the vibrational feedback path and the attributes of the mechanical stimulation delivered to the recipient. As such, it would be ideal to intra-operatively determine (i.e., during surgical implantation of the prosthesis 100) how the sound sensor 112 will be affected by vibrational feedback from the actuator 106 at a given implanted location with the recipient. That is, it would be beneficial to determine the vibrational response of the sound sensor 112 to vibration of the actuator 106, before the suture is closed during surgery.

However, it has been discovered that it is not possible to intraoperatively determine the vibrational response of an implanted sound sensor to the vibration of an implanted actuator because the intraoperative vibration sensitivity of a sound is very different from the post-operative vibration sensitivity of the sound sensor. The difference in intraoperative vibration sensitivity and post-operative vibration sensitivity of a sound sensor is a result of a number of post-surgical factors, such as skin flap thickness (i.e., the thickness of the layer of skin that will positioned over the sound sensor), skin tension, healing processes, etc., none of which can be accurately accounted for in the surgical environment.

As such, recognizing the differences in intraoperative vibration sensitivity and post-operative vibration sensitivity of a sound sensor, the inventors of the present application have proposed techniques to intraoperatively generate/determine an estimated vibrational sensitivity of a sound sensor to the actuator based on data captured by a vibration sensor that is co-located with the sound sensor (e.g., the sound sensor and vibration sensor are both located within a sound input module). Stated differently, presented herein are techniques that intraoperatively determine (i.e., during surgical implantation of the prosthesis) how a vibration sensor will be affected by vibrational feedback from the actuator at a given implanted location with the recipient. However, such determinations are made based on data obtained from a vibration sensor, and not based on data obtained by the sound sensor. In particular, the vibration sensor, which is co-located with the sound sensor, and which is rigidly coupled to the skull, has a vibration sensitivity that is independent of the post-surgical factors that affect/change the sensitivity of the sound sensor (i.e., the sensitivity of the vibration sensor is independent of skin flap thickness, skin tension, healing processes, etc.). As such, the data captured from the vibration sensor is used to objectively evaluate a suitability of a location for implantation of the sound input module.

Accordingly, presented herein are in-situ techniques that capture/acquire data that objectively characterize the implanted location of an implantable sound sensor relative to an implanted location of an implantable actuator arrangement, but do so based on indirect/tangential data related to the co-located vibration sensor. In particular, in accordance with the techniques presented herein, the processing unit of the auditory prosthesis (e.g., middle ear auditory prosthesis 100) is used, in-situ, to capture data, sometimes referred to herein as "vibrational feedback data," representing the vibrational transfer function between the vibration sensor 114 and the actuator 106. In general, the vibrational feedback data includes the vibrations detected by the vibration sensor 114 and/or attributes of the actuator control signals that induced those vibrations. The vibrational transfer function, which is generated from the vibrational feedback data, represents the vibrations detected by the vibration sensor 114, relative to attributes of the actuator control signals that induced those vibrations (i.e., data representing the electrical output provided to the implanted actuator relative to the electrical output from the implanted vibration sensor).

In the example of FIGS. 1A-1C, the electrical output provided to the implanted actuator 106 is the stimulation control signals 121, while the electrical output from the implanted vibration sensor 114 is the vibration sensor output signals 119. As such, in the example of FIGS. 1A-1C, the vibrational transfer function is determined from an analysis of the stimulation control signals 121 relative to the vibration sensor output signals 119.

As described further below, the vibrational transfer function can be provided to a user (e.g., surgeon). If the vibrational transfer function has values outside of an acceptable range, then that is an indicator of misplacement of the entire sound input unit 102, and therefore misplacement of the sound sensor 112, relative to the actuator arrangement 145. Accordingly, the techniques presented herein provide the ability to perform an objective assessment of the placement of the vibration sensor with regard to its impact on gain, which provides guidance to surgeons, especially less experienced surgeons.

As noted, the vibrational transfer function from the input to the implanted actuator (e.g., stimulation control signals 121) to the output from the vibration sensor (e.g., vibration sensor output signals 119) is measured intraoperatively. However, this measurement may be performed in several different manners, including via an open-loop measurement technique or via a closed-loop measurement technique. Further details regarding example open-loop measurement techniques are provided below with reference to FIG. 2, while further details regarding closed-loop measurement techniques are provided below with reference to FIG. 3. For ease of description, the example open-loop measurement techniques and the closed-loop measurement techniques are described with reference to elements of middle ear auditory prosthesis 100 of FIGS. 1A-1E.

Figure 2:
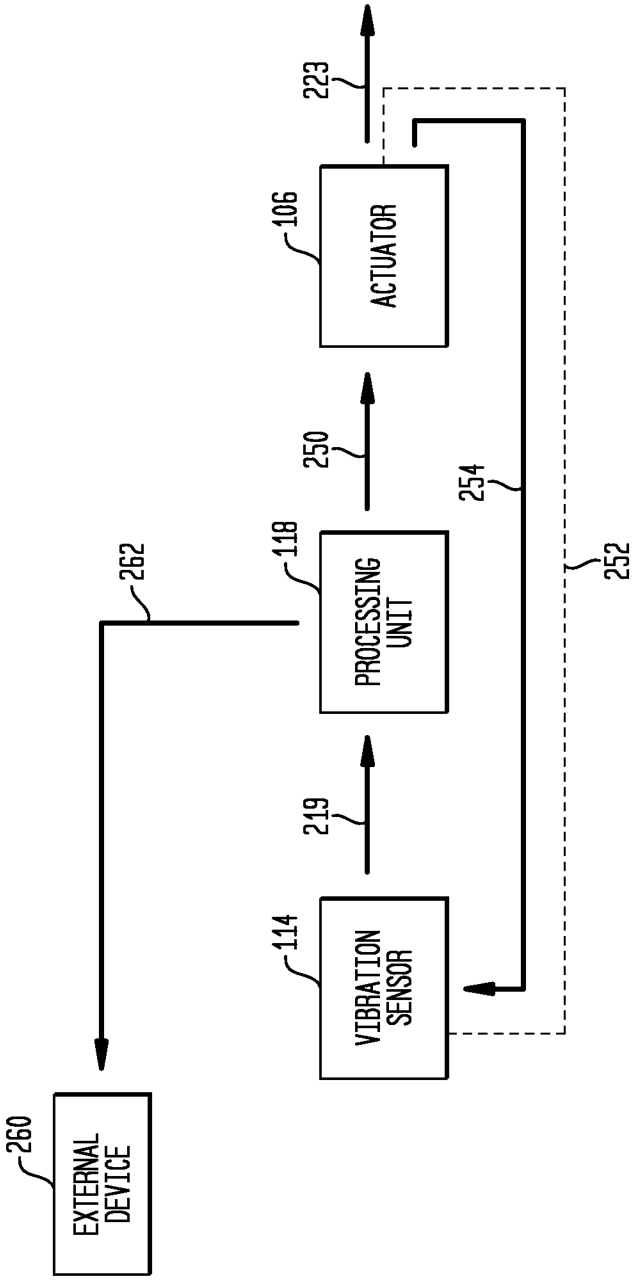
FIG. 2 is a schematic block diagram illustrating an open-loop vibrational feedback measurement technique, in accordance with certain embodiments presented herein.

Referring first to FIG. 2, shown is an example open-loop measurement technique in which the vibrational feedback measurement is performed by injecting a test signal into the actuator 106 and measuring the resulting output signal from the vibration sensor 114. More specifically, as shown in FIG. 2, the actuator 106 is driven with test control signals 250 (e.g. stimulation control signals with specific attributes) to cause the actuator 106 to vibrate and, accordingly, deliver mechanical test stimulation signals (test signals or test vibrations) 223 to a predetermined structure (e.g., ossicular chain, skull bone, cochlea, etc.) in the head of the recipient. The test signals 223 may be any of a number of different signals for use in characterizing a vibrational transfer function. Example test signals include, but are not limited to, white noise signals (i.e., signals representing white noise), a maximum-length-sequence, a series of sinewave tones presented simultaneously or sequentially, a series of narrowband noise signals presented simultaneously or sequentially, a sinewave sweep, etc.

In general, the feedback that reaches vibration sensor 114 is dependent on the frequency of the test signals 223. That is, the vibrational transfer function will vary with frequency. As such, the test signals 223 (and thus the test control signals 250) will include a plurality of different frequencies (e.g., different frequencies in the range of 250 Hertz (Hz) to 4,000 Hz) so as enable objective evaluation of the feedback across a selected frequency range.

In certain embodiments, the test control signals 250 are generated by the processing unit 118. However, in other embodiments, the test control signals 250 are calculated by an external device (e.g., external device 260 shown in FIG. 2) and downloaded into the processing unit 118 via an inductive link, wireless link, etc. prior to implantation, prior to the start of the measurement, etc. In still other embodiments, the test control signals 250 are calculated by an external device and streamed, in real-time, into the processing unit 118 via an inductive link, wireless link, etc. (e.g., during the measurement).

Returning to the specific example of FIG. 2, when the test control signals 250 are used to drive the actuator 106, a portion of the test signals 223 may pass from the actuator 106 and/or the fixation system 142 to the vibration sensor 114 via a vibrational feedback path. As noted, the portion of the test signals 223 that passes from the actuator 106 and/or the fixation system 142 to the vibration sensor 114 is referred to herein as vibrational feedback. Also as noted, the vibrational feedback path may be a direct path (i.e., where the feedback passes directly from the actuator arrangement 145 to the housing 110 coupled to the vibration sensor 114) or an indirect path (e.g., where the feedback passes from the actuator arrangement 145 the housing 110 coupled to the vibration sensor 114 via bones, cartilage, etc.). In FIG. 2, the vibrational feedback path is represented by dashed line 252, while the vibrational feedback is represented by arrow 254.

The vibrational feedback 254 that passes through the vibrational feedback path 252 is captured/detected by the vibration sensor 114 as vibrations, which in turn results in the generation of corresponding vibration sensor output signals 219.

The vibration sensor 114 provides the vibration sensor output signals 219 to the processing unit 118. In certain embodiments, the processing unit 118 is configured to analyze the one or more vibration sensor output signals 219 relative to the test signals 250 to determine the vibrational transfer function for the vibration sensor 114 at the specific implanted location. That is, the processing unit 118 is configured to determine, based on the vibration sensor output signals 219 and the test signals 250, how the vibration sensor 114 is affected by vibration of the actuator 106, when the vibration sensor 114 is at the specific implanted location. As such, the transfer function for the vibration sensor 114 is location-dependent and is sometimes referred to herein as a "location-dependent vibrational transfer function."

The processing unit 118 receives input signal seen by the vibration sensor 114 (represented in the vibration sensor output signals 219), where this input signal is a combination of the vibrational feedback 254 (signal of interest) and uncorrelated background noise, which is irrelevant, but may be larger than the signal of interest and may therefore prevent the determination of the value of the signal of interest. Methods to increase the level of the relevant (feedback) signal relative to the level of the irrelevant (background noise) signal, such as time-domain averaging or filtering, can be employed to generate a "clean" input signal used to determine the vibrational transfer function. The vibrational transfer function is the ratio of the input signal level seen by the vibration sensor 114 (represented in the vibration sensor output signals 219) to the output signal level produced by the actuator 106, on a per frequency basis. These levels can be expressed as peak or as RMS values.

As noted, the vibrations captured by the vibration sensor 114 are in-situ measurements. As such, in certain examples, the processing unit 118 is configured to perform some pre-processing of the vibration sensor output signals 219. For example, the vibration sensor output signals 219 may be pre-processed to normalize for background noises (e.g., the recipient's breathing, etc.), the vibration sensor output signals 219 may be filtered for extraction of the actuator signals (e.g., for the frequency of the sinewave used to drive into the actuator), etc. and to isolate the vibrations attributable to the mechanical stimulation signals.

Returning to FIG. 2, data representing the location-dependent vibrational transfer function may be sent to an external device for further analysis and/or for presentation to the surgeon. As described further below, the location-dependent vibrational transfer function can be presented to a user (e.g., surgeon) in a number of different manners, such as via visual displays, audible tones, etc. In FIG. 2, the data presenting the location-dependent vibrational transfer function is represented by arrow 262, where the data is wirelessly sent from the processing unit 118 to the external device 260.

The location-dependent vibrational transfer function can be used to objectively evaluate the implanted location of the sound input module 102, which includes both the sound sensor 112 and the vibration sensor 114. For example, if the location-dependent vibrational transfer function is outside of an acceptable range (e.g., above a certain threshold) at one or more frequencies, then that is an indicator of misplacement of the sound input module 102 relative to the actuator arrangement 145. If the location-dependent vibrational transfer function is outside of the acceptable range, the surgeon may change the location of the sound input module 102 relative to the actuator arrangement 145 (e.g., re-locate one or more of the sound input module 102 and or the fixation system 142).

Once the location of the sound input module 102 relative to the actuator arrangement 145 is changed, an updated location-dependent vibrational transfer function can be determined (e.g., in substantially the same was as was described above). The updated location-dependent vibrational transfer function can again be used to objectively evaluate the implanted location of the sound input module 102. This process can be continued until an acceptable location-dependent vibrational transfer function is determined. At that point, the measurements can be terminated and the surgeon can complete the remainder of the surgery (e.g., close the surgical incision, etc.).

As noted, FIG. 2 illustrates an embodiment in which the processing unit 118 is configured to determine the location-dependent vibrational transfer function. As noted, in these embodiments, the data 262 representing the location-dependent vibrational transfer function is sent to the external device 260 for further analysis and/or for presentation to the user. That is, in certain embodiments, the vibrations captured by the vibration sensor 114 are obtained, preprocessed, and correlated with the actuator control signals by the processing unit 118 and only the resulting location-dependent feedback transfer is sent to the external device 260. However, in alternative embodiments, the processing unit 118 may be configured to obtain the vibrations captured by the vibration sensor 114, but the analysis is performed at the external device 260. In such embodiments, the pre-processing, if needed, can be performed at either of the processing unit 118 of the external device 260.

For example, in an alternative embodiment, the processing unit 118 obtains the vibration sensor output signals 219 and then streams, in real-time, the vibration sensor output signals 219 to the external device 260. In these examples, the external device 260 also is aware of the attributes of test signals 250 (e.g., determines the one or more test signals, receives the attributes of the one or more test signals from the processing unit 118, etc.) and, as such, can determine the location-dependent vibrational transfer function.

Figure 3:
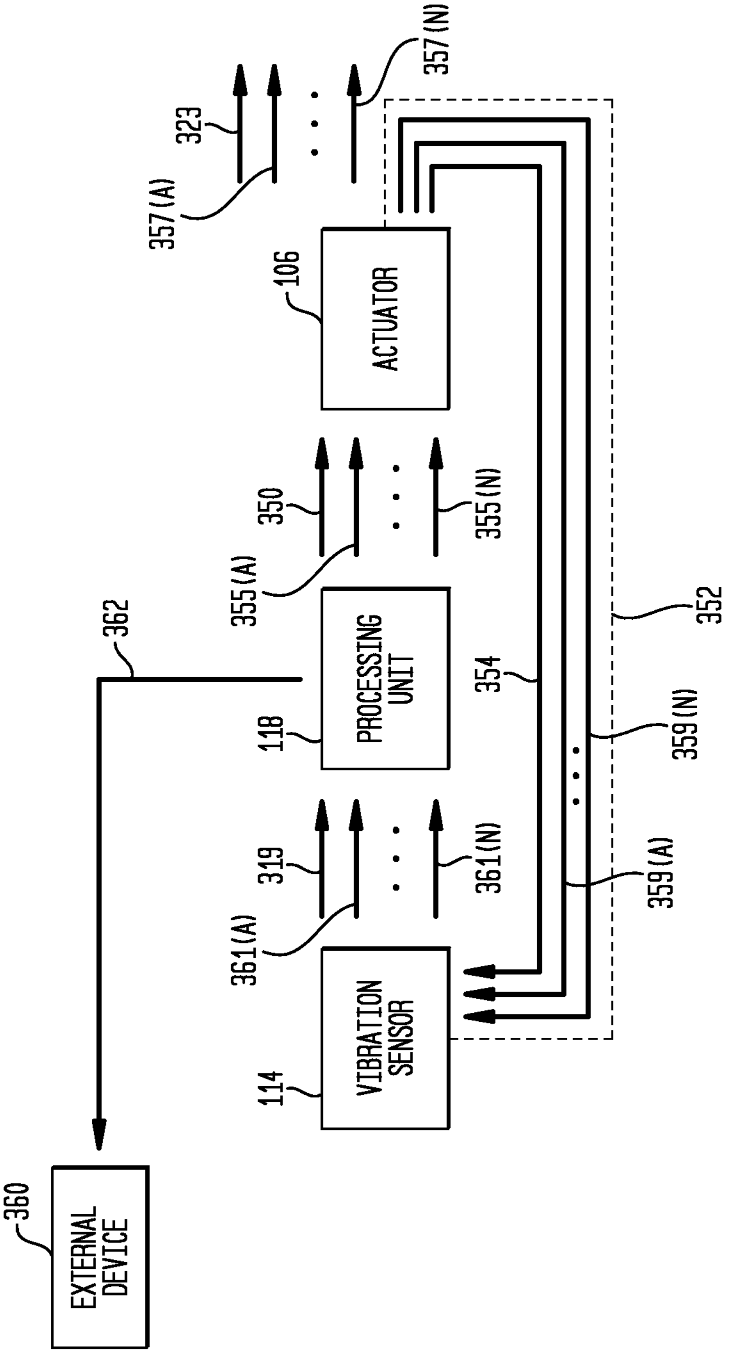
FIG. 3 is a schematic block diagram illustrating a closed-loop vibrational feedback measurement technique, in accordance with certain embodiments presented herein.

As noted, FIG. 2 illustrates an open-loop measurement technique for determination of a location-dependent vibrational transfer function. FIG. 3 illustrates an alternative closed-loop measurement technique for determination of a location-dependent vibrational transfer function. In the examples of FIG. 3, the location-dependent vibrational transfer function is determined by sending the amplified vibration sensor signal to the actuator, and then increasing the gain until feedback can be detected.

More specifically, in the example of FIG. 3, some initial signals 350 are used to drive the actuator 106, resulting in the delivery of initial mechanical test stimulation signals (initial vibration) 323 to a predetermined structure (e.g., ossicular chain, skull bone, cochlea, etc.) in the head of the recipient. The initial signals 323 may be any of a number of different signals, such ambient noise, a predetermined signal at a selected frequency, etc.

When the initial signals 350 are used to drive the actuator 106, a portion of the initial vibration 323 may pass from the actuator 106 and/or the fixation system 142 to the vibration sensor 114 via a vibrational feedback path. The portion of the initial vibration 323 that passes from the actuator 106 and/or the fixation system 142 to the vibration sensor 114 is referred to herein as "initial" vibrational feedback. As noted above, the vibrational feedback path may be a direct path (i.e., where the feedback passes directly from the actuator arrangement 145 to the housing 110 coupled to the vibration sensor 114) or an indirect path (e.g., where the feedback passes from the actuator arrangement 145 the housing 110 coupled to the vibration sensor 114 via bones, cartilage, etc.). In FIG. 3, the vibrational feedback path is represented by dashed line 352, while the initial vibrational feedback is represented by arrow 354.

The initial vibrational feedback 354 that passes through the vibrational feedback path 352 is captured/detected by the vibration sensor 114 as vibrations, which in turn results in the generation of corresponding vibration sensor output signals 319. This output signals 319 are then provided to the processing unit 118 for amplification and stimulation of the recipient.

Therefore, a process of: (1) delivering amplified test control signals to the actuator 106 (represented by arrows 355(A)-355(N)), (2) delivering amplified test signals to the recipient via the actuator (represented by arrows 357(A)-357(N)), (3) capturing amplified vibrational feedback at the vibration sensor 114, and (4) and providing corresponding vibration sensor output signals to the processing unit 118 (represented by arrows 361(A)-361(N)) is iteratively repeated, where the applied gain (and thus vibrational feedback) increases with each iteration. The iterations continue until the applied gain causes the processing unit 118 to detect a maximum stable gain (e.g., how much gain can be provided without getting feedback). In certain examples, maximum stable gain has been surpassed when "squealing" is detected. In general, squealing is the point at which the system detects that the output level saturates, i.e. reaches the maximum permitted by the amplifier input-output curve. That is, once the applied gain reaches a certain level, then the amount of vibrational feedback detected by the vibration sensor 114 will become too high, which can be detected in the processing unit 118. In this way, the processing 118 is configured to determine the gain level that will result in the squealing, which indicates that the maximum stable gain for the system has been exceeded. The location-dependent vibrational transfer function for the vibration sensor (i.e., how the vibration sensor 114 is affected by vibration of the actuator 106, when the vibration sensor 114 is at the specific implanted location) can, in turn, be deduced from the maximum stable gain.

For example, the system can perform a measurement of the feedback path, referred to as the "device under test" (DUT). The input to the DUT is the voltage out of the implant to the actuator. The output of the DUT is the voltage out of the vibration sensor. As such, a vibrational transfer function of 0.1 means that, if the actuator is driven with 500 mV, then the system will measure 50 mV at the vibration sensor. Assume now that a sound creates an actuator input of 1 mV and the processing unit amplifies the input by a factor of nine (9), the 1 mV signal will get amplified to 1×9 or 9 mV at the output, which will result in a feedback signal of 0.9 mV in the next "cycle", and 0.9×9×0.1 in the next cycle, and less, and less, then the system is stable. However, if the processor amplifies by a factor of eleven (11), then a 1 mV input signal will become 11 mV at the output, which will cause a feedback signal of 1.1 mV in the next cycle, and 1.1×11×0.1 in the next cycle, and more, and more, until the system saturates, which creates audible feedback. Therefore, if the feedback gain is G, then the maximum stable forward gain that will not create this catastrophic behavior if it is just under 1/G.

As noted, the feedback that reaches vibration sensor 114 is dependent on the frequency of the signals. That is, the vibrational transfer function will vary with frequency. As such, the closed-loop measurement, described above, may be performed at a plurality of different frequencies (e.g., different frequencies in the range of 250 Hertz (Hz) to 4,000 Hz) so as enable objective evaluation of the feedback across a selected frequency range.

Similar to the above embodiments, data representing the location-dependent vibrational transfer function may be sent to an external device for further analysis and/or for presentation to the surgeon. As described further below, the location-dependent vibrational transfer function can be presented to a user (e.g., surgeon) in a number of different manners, such as via visual displays, audible tones, etc. In FIG. 3, the data representing the location-dependent vibrational transfer function is represented by arrow 362, where the data is wirelessly sent from the processing unit 118 to the external device 360.

As in the above embodiments, the location-dependent vibrational transfer function can be used to objectively evaluate the implanted location of the sound input module 102 (which includes the sound sensor 112 and the vibration sensor 114). For example, if the location-dependent vibrational transfer function is outside of an acceptable range (e.g., above a certain threshold) at one or more frequencies, then that is an indicator of misplacement of the sound input module 102 relative to the actuator arrangement 145. If the location-dependent vibrational transfer function is outside of the acceptable range, the surgeon may change the location of the sound input module 102 relative to the actuator arrangement 145 (e.g., re-locate one or more of the sound input module 102 and/or the fixation system 142).

Once the location of the sound input module 102 relative to the actuator arrangement 145 is changed, an updated location-dependent vibrational transfer function can be determined (e.g., in substantially the same was as was described above). The updated location-dependent vibrational transfer function can again be used to objectively evaluate the implanted location of the sound input module 102. This process can be continued until an acceptable location-dependent vibrational transfer function is determined. At that point, the measurements can be terminated and the surgeon can complete the remainder of the surgery (e.g., close the surgical incision, etc.).

As noted, FIG. 3 illustrates an embodiment in which the processing unit 118 is configured to determine the location-dependent vibrational transfer function. As noted, in these embodiments, the data 362 representing the location-dependent vibrational transfer function is sent to the external device 360 for further analysis and/or for presentation to the user. That is, in certain embodiments, the vibrations captured by the vibration sensor 114 are obtained, preprocessed, and correlated with the actuator control signals by the processing unit 118 and only the resulting location-dependent feedback transfer is sent to the external device 360. However, in alternative embodiments, the processing unit 118 may be configured to obtain the vibrations captured by the vibration sensor 114, but the analysis is performed at the external device 360. In such embodiments, pre-processing, if needed, can be performed at either of the processing unit 118 of the external device 360.

As noted, a location-dependent vibrational transfer function for vibration sensor 114, determined as described herein provides, an objective indication of the vibrational sensitivity of the sound sensor 112 (which is co-located with the vibration sensor in the sound input module 102) to vibration of the actuator 106, at their respective locations within the recipient. Also as noted, direct contact between the actuator arrangement 145 and the housing 110 of the sound input module 102 is positioned problematic. In addition, also as noted above, due to recipient-specific physical characteristics, different positions with each recipient will provide greater or less amounts of vibration sensitivity. 106. As such, in practice, the techniques presented herein may be implemented in several different manners.

For example, in certain embodiments, the actuator 106 may be implanted in the recipient at a target location, and the vibration sensor 114 is implanted at a first location. This first location could be selected based, for example, on normative data (e.g., studies, prior recipient data, etc.). One of the above techniques is the used to determine the location-dependent vibrational transfer function for the vibration sensor 114 at that first location. The location-dependent vibrational transfer function determined for the vibration sensor 114 at that first location could then be compared to a predetermined location-dependent vibrational transfer function to evaluate whether the first location is acceptable (e.g., if the vibrational feedback between the vibration sensor 114 and the actuator 106 is less than a predetermined threshold at the first location). If not, the vibration sensor 114 can be moved to a second location where the process is repeated to determine a location-dependent feedback transfer for the vibration sensor 114 at the second location. This process can be repeated for several locations and the results for each location compared to one another in order to select a preferred/optimal location. Alternatively, the process can be repeated until a location having an acceptable location-dependent vibrational transfer function is identified.

As noted above, the location-dependent vibrational transfer function may be provided to a user (e.g., surgeon) in a number of different manners. In certain embodiments, the results of the location-dependent vibrational transfer function can be analyzed relative to normative data (e.g., derived from previous surgeries, cadaver studies, etc.) and the user is provided with an indication of whether the evaluated location is acceptable. For example, the result of the comparison could be displayed as a pass/fail categorization for the specific (tested) vibration sensor location (e.g., by expressing present results in relation to the distribution of normative values, e.g. as a percentile, etc.). The pass/fail indication would a visible indication, audible indication, etc.

In certain embodiments, the location-dependent vibrational transfer function is presented to the user in a numerical form by an external device (e.g., external devices 260 or 260) in communication with the processing unit 118. In other embodiments, the results of a transfer function measurement are presented to the clinician in graphical form, such as a curve of feedback gain versus frequency, by an external device.

Figure 4:
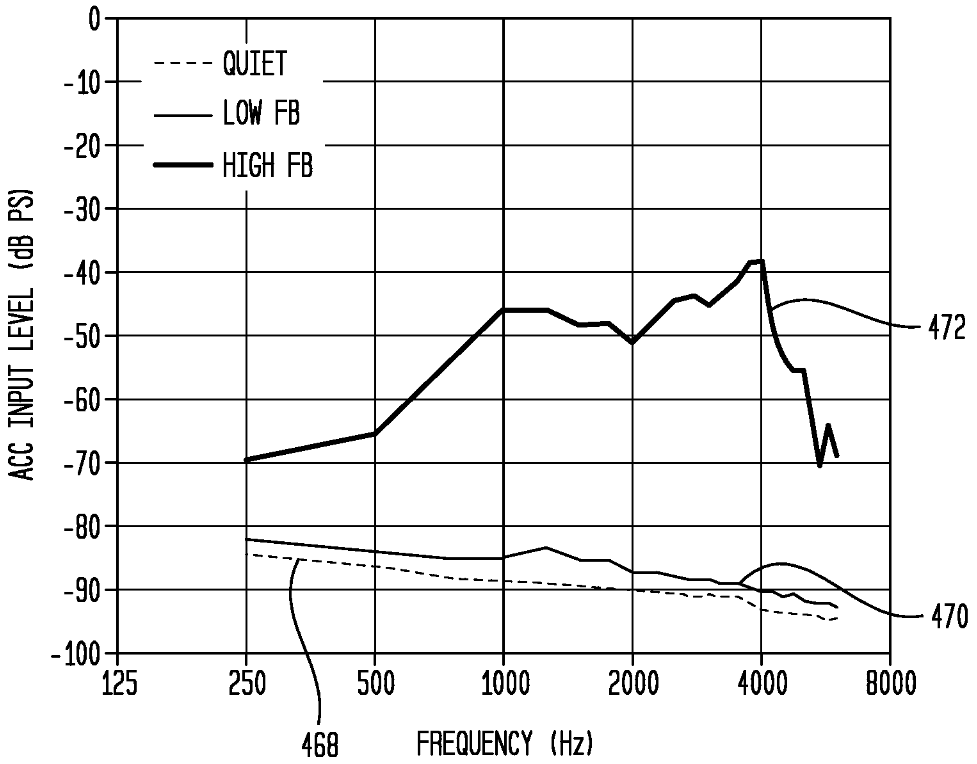
FIG. 4 is a graph illustrating the results of two example vibrational feedback measurements, in accordance with certain embodiments presented herein.

For example, shown in FIG. 4 is an example graph 466 of vibration sensor input level in Decibels relative to full scale (dB FS) versus frequency, which illustrates the input level (vibrations) seen by the vibration sensor due to a (constant level) stimulation of the actuator. In general, the higher the input level, the worse (larger) is the vibrational transfer function (worse the vibrational feedback).

In FIG. 4, curve/line 468 is the input level without stimulation (i.e., just the background noise in the room), referred to as "Quiet." In FIG. 4, curve 470 illustrates a "low feedback (low FB)" condition where the actuator is well isolated from the vibration sensor, while curve 472 illustrates a "high feedback (high FB) condition with the actuator in direct contact with a housing in which the vibration sensor is positioned. FIG. 4 illustrates that the vibration sensor input level is much higher in the "high FB" condition, especially around 500 Hz to 4000 Hz. This would cause massive feedback and massive gain limitations in a recipient. In fact, for the low FB, the vibration sensor signal is so small it cannot be distinguished from the background noise 468, except around 1200 Hz.

In one example of FIG. 4, the curves 470 and 472 represent two different implanted locations for an vibration sensor relative to an implanted actuator. As such, in certain examples, the curves 470 and 472 (as well as other curves) could be presented to a surgeon and the surgeon could identify the location corresponding to curve 470 as the optimal placement for the vibration sensor in the particular recipient.

Figure 5:
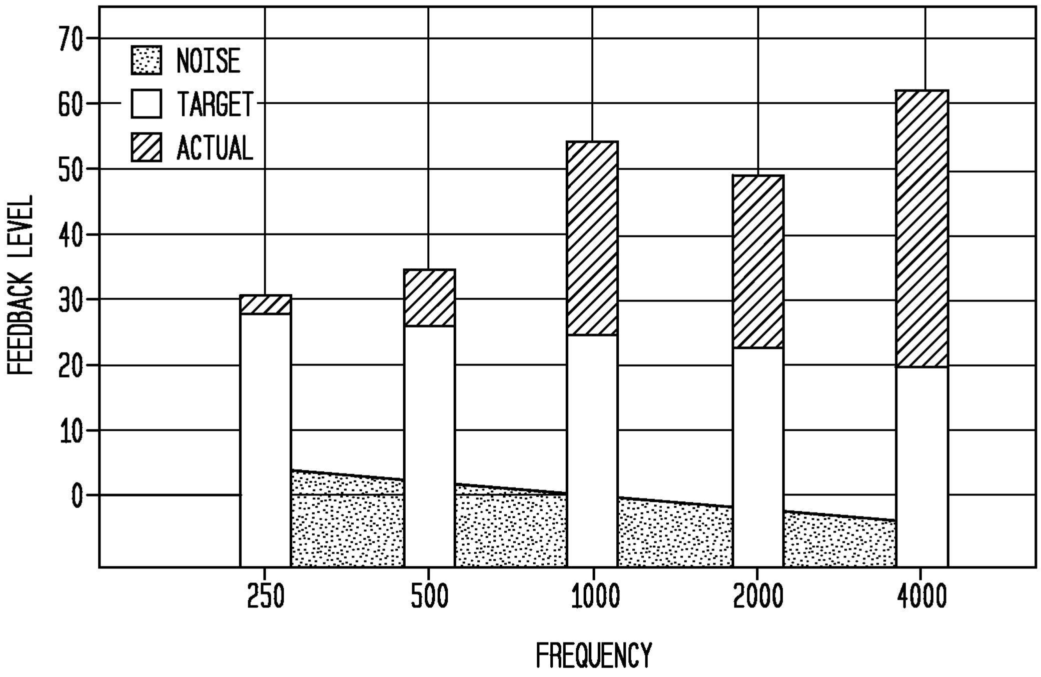
FIG. 5 is a schematic diagram illustrating an example informational display that may be generated based on vibrational feedback measurements, in accordance with certain embodiments presented herein.

In one example, the graph 466 could be displayed to a user. However, in another example, the data represented in graph 466 could be displayed to a user in one or more other formats. For example, FIG. 5 illustrates an example informational display 575 that may be generated based on the data shown in FIG. 4. In particular, FIG. 5 illustrates the feedback level versus frequency. In this example, the "target" values are predetermined values indicating what feedback levels can/should be achieved at different frequencies. The target values may be generated, for example, based on a body of normative data from previous surgeries, clinical studies, etc. The "actual" values illustrates the feedback levels measured by the surgeon and, accordingly, indicate how far away he/she is from target performance. The background noise floor as an indication of a maximum possible performance at a given frequency (e.g., if the noise floor is higher than the target then the noise level in the operating room is too high and the measurement cannot proceed).

In other embodiments, the results of a transfer function measurement could be presented to the user as an acoustic signal, where the relevant value is encoded in at least one of loudness, pitch, and/or repetition rate of the acoustic signal. For example, low frequency beeps could indicate a low transfer function (i.e., low feedback), while high frequency beeps could indicate a high transfer function (i.e., high feedback), etc.

As noted above, the techniques presented herein enable the objective evaluation/assessment of the placement of an implantable sound input module, relative to an implantable actuator, by determining a vibrational transfer function between an implantable vibration sensor (co-located with a sound sensor in the sound input module) and the implantable actuator. In certain embodiments, the suitability of an implanted location for a sound input module is determined by comparing two or more location-dependent vibrational transfer functions, each associated with different locations, to one another. The location with the lowest location-dependent vibrational transfer function (i.e., indicating the lowest feedback between the vibration sensor and the actuator) is selected as an optimal or preferred location.

In certain embodiments, the suitability of an implanted location for a sound input module is determined by comparing a location-dependent vibrational transfer function determined for the implanted location to one or more predetermined vibrational transfer functions. That is, if the location-dependent vibrational transfer function indicates that the vibrational feedback is below a predetermined threshold levels for selected frequencies, then the location corresponding to that location-dependent vibrational transfer function may be a suitable location for the sound input module. In certain such embodiments, the predetermined vibrational transfer function may be a standard predetermined vibrational transfer function for all patients. However, in other embodiments, the predetermined vibrational feedback transfer used for comparison can be different for different recipients.

For example, recipient's may have different levels of hearing loss which, in turn, affects the amount of gain that needs to be applied by the implantable middle ear auditory prosthesis. As noted, the amount of vibrational feedback can limit the amount of gain that can be applied. Therefore, with recipient's having greater hearing loss (and thus requiring greater gain), there is a need to ensure that the sound sensor is less sensitive to vibration of the actuator. However, with recipient's having less hearing loss (and thus requiring less gain), the need for less vibrational sensitivity of the sound sensor to vibration of the actuator may be less important. Accordingly, the predetermined vibrational transfer function used for comparison to a location-dependent vibrational transfer function could be a function of the recipient's hearing loss, where lower vibrational feedback is required for recipient's with greater hearing loss.

Figure 6:
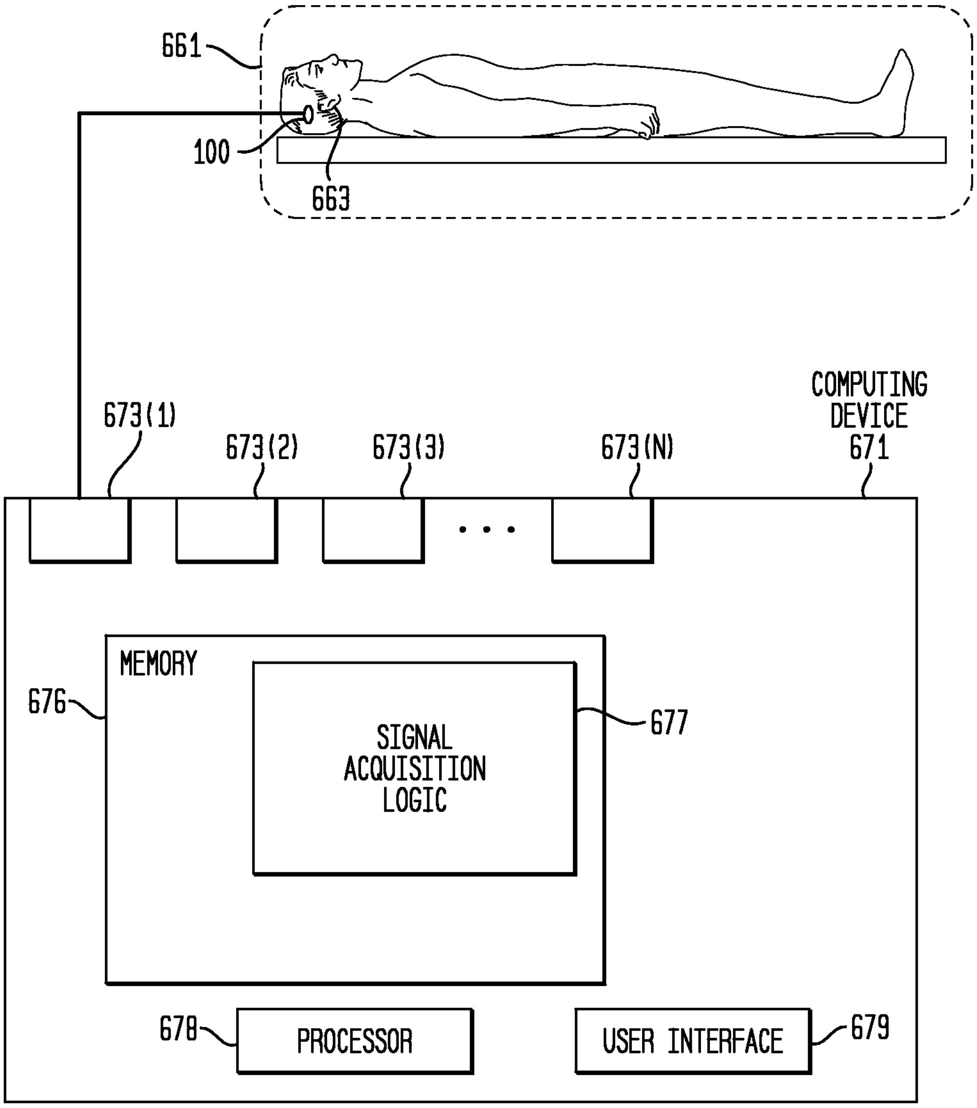
FIG. 6 is a block diagram of a fitting system configured to execute techniques in accordance with embodiments of the present invention.

In one example, the recipient's audiometric data (e.g., audiogram) could be entered or imported before surgery and the system calculate how much gain the recipient is likely to need (plus some safety margin) to account for, for example, possible inaccuracies of the measurements and calculations and/or foreseeable progression of the recipient's hearing loss for some period of time in the future. This information could, in turn, be used to calculate the predetermined vibrational transfer function used for comparison to a location-dependent vibrational transfer function. Stated differently, the total required gain (represented by the predetermined vibrational transfer function, as determined from the hearing loss) could be compared to the prediction achievable gain (represented by the location-dependent vibrational transfer function). If the currently achievable gain is far below the required gain, then the user would be provided an indication that the tested location is unacceptable. If the achievable gain is acceptable, either because the achievable gain is very high (low feedback, good surgical result, etc.), or because the required gain is low (mediocre feedback, but good residual hearing of the patient), then the user would be provided an indication that the tested location is acceptable As noted above, aspects of the techniques presented herein may be performed at an external device, such as external devices 260 and 360 of FIGS. 2 and 3, respectively. FIG. 6 is block diagram illustrating an computing device 671 configured to execute such aspects of the techniques presented herein, in accordance with certain embodiments.

Computing 671 comprises one or more interfaces/ports 673(1)-673(N), a memory 676, a processor 678, and a user interface 679. The interfaces 673(1)-673(N) may comprise, for example, any combination of network ports (e.g., Ethernet ports), wireless network interfaces, Universal Serial Bus (USB) ports, Institute of Electrical and Electronics Engineers (IEEE) 1394 interfaces, PS/2 ports, etc. In the example of FIG. 6, interface 673(1) is connected to a coil 663 in communication with coil 108 of middle ear auditory prosthesis 100, which is implanted in a recipient 661. Alternatively, interface 673(1) may be configured to communicate with cochlear implant system 100 via a short-range wireless connection (e.g., Bluetooth, etc.).

The user interface 679 includes one or more output devices, such as a liquid crystal display (LCD) and a speaker, for presentation of visual or audible information to a clinician, audiologist, or other user. The user interface 679 may also comprise one or more input devices that include, for example, a keypad, keyboard, mouse, touchscreen, etc.

The memory 676 comprises signal acquisition logic 677. In general, the signal acquisition logic 677, when executed by the processor 678, causes the computing device 671 to perform operations described elsewhere herein. For example, in certain embodiments, the signal acquisition logic 677 may be executed to provide a user with an audible or visual indication of a vibrational transfer function. In certain embodiments, the vibrational transfer function feedback analysis logic 677 may also be executed to determine the vibrational transfer function and/or control aspects of an open-loop or closed-loop feedback measurement at the middle ear auditory prosthesis 100.

Memory 676 may comprise read only memory (ROM), random access memory (RAM), magnetic disk storage media devices, optical storage media devices, flash memory devices, electrical, optical, or other physical/tangible memory storage devices. The processor 678 is, for example, a microprocessor or microcontroller that executes instructions for the signal acquisition logic 677. Thus, in general, the memory 676 may comprise one or more tangible (non-transitory) computer readable storage media (e.g., a memory device) encoded with software comprising computer executable instructions and when the software is executed (by the processor 678) it is operable to perform the techniques described herein.

It is to be appreciated that the arrangement for computing device 671 shown in FIG. 6 is merely illustrative and that aspects of the techniques presented herein may be implemented at a number of different types of external devices. For example, the computing device 671 could be a laptop computer, tablet computer, mobile phone, surgical system, etc.

Figure 7:
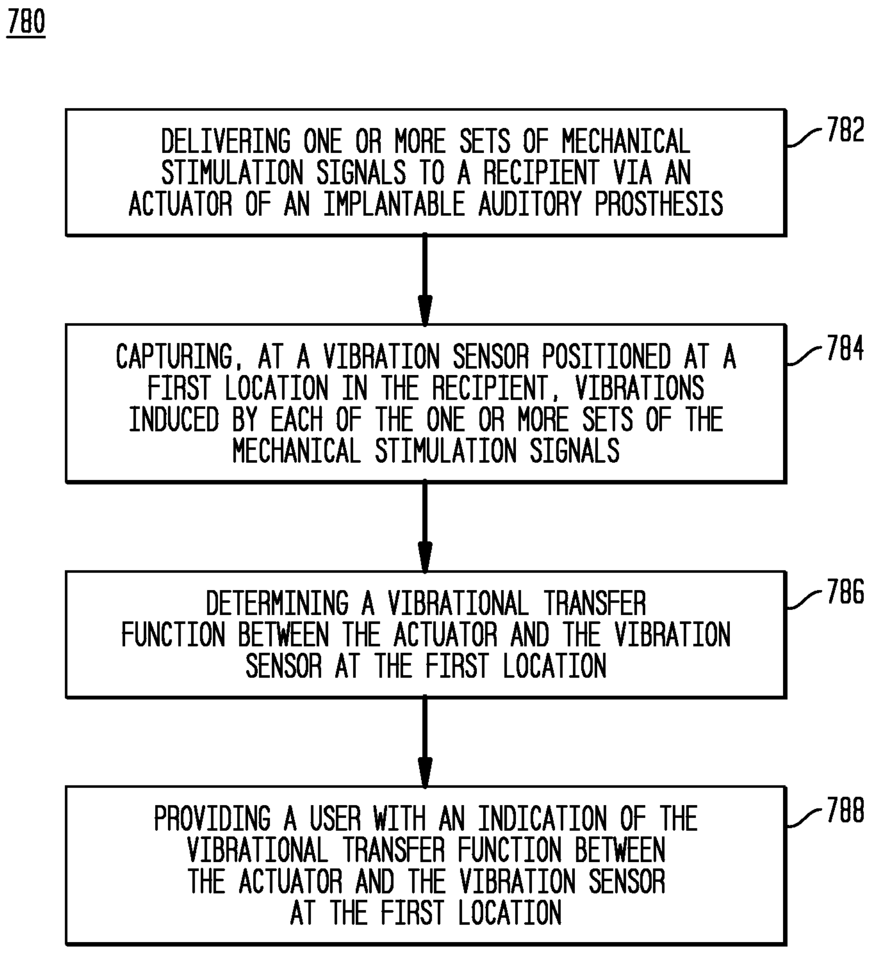
FIG. 7 is a high-level flowchart of a method, in accordance with certain embodiments presented herein.

FIG. 7 is a high-level flowchart of a method 780, in accordance with embodiments presented herein. Method 780 begins at 782 where one or more sets of mechanical stimulation signals are delivered to a recipient via an actuator of an implantable auditory prosthesis. At 784, an vibration sensor positioned at a first location in the recipient captures vibrations induced by each of the one or more sets of the mechanical stimulation signals. At 786, a vibrational transfer function between the actuator and the vibration sensor at the first location is determined. At 788, a user is provided with an indication of the vibrational transfer function between the actuator and the vibration sensor at the first location.

Figure 8:
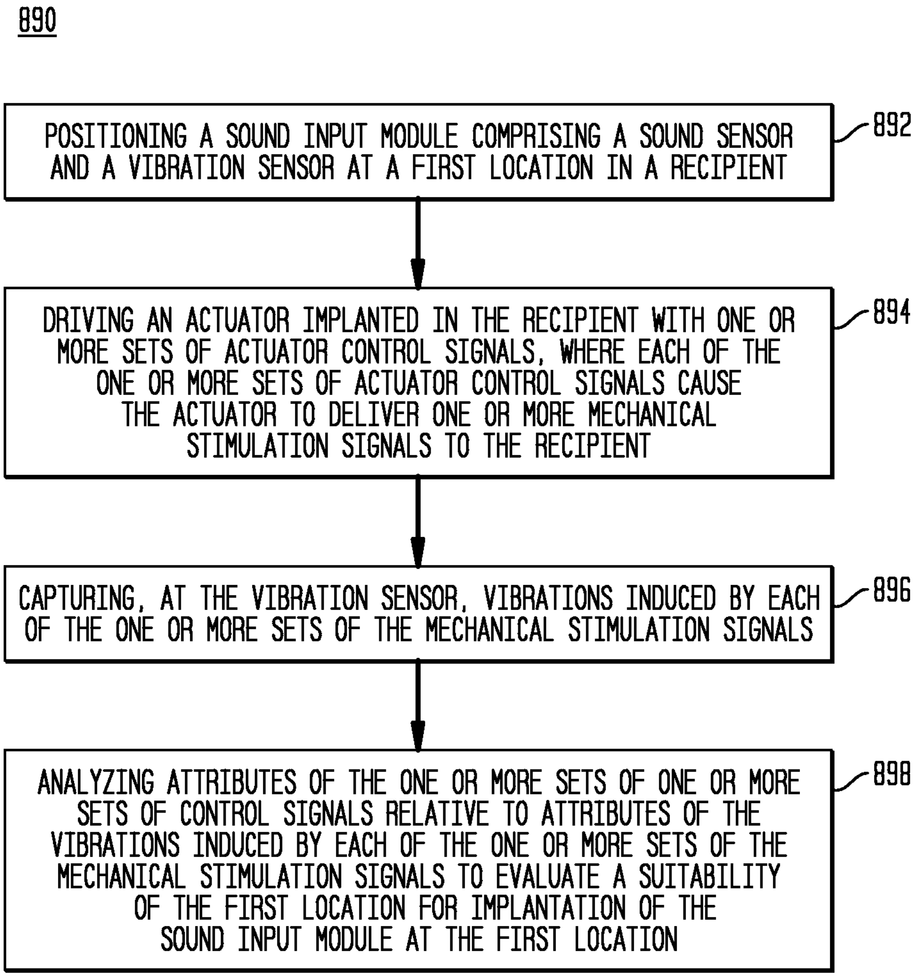
FIG. 8 is a high-level flowchart of another method, in accordance with certain embodiments presented herein.

FIG. 8 is a high-level flowchart of a method 890, in accordance with embodiments presented herein. Method 890 begins at 892 a sound input module comprising a sound sensor and a vibration sensor is positioned at a first location in a recipient. At 894, an actuator implanted in the recipient is driven with one or more sets of actuator control signals, where each of the one or more sets of actuator control signals cause the actuator to deliver one or more mechanical stimulation signals to the recipient. At 896, vibrations induced by the mechanical stimulation signals are captured at the vibration sensor. At 898, attributes of the one or more sets of one or more sets of actuator control signals are analyzed relative to attributes of the vibrations induced by each of the one or more sets of the mechanical stimulation signals to evaluate a suitability of the first location for implantation of the sound input module at the first location.

Embodiments have been primarily described above with reference to implantable actuators that delivery vibration to, for example, the recipient's ossicular chain and/or the recipient's cochlea. However, as noted elsewhere herein, these embodiments are merely illustrative and the techniques presented herein may be implemented with any of a number of different implantable actuators. For example, the techniques presented herein may be implemented with implantable actuators that delivery vibration directly to the skull bone of the recipient (e.g., active transcutaneous bone conduction devices). In another example, the techniques presented herein may be implemented with implantable actuators that are part of a prosthesis that delivers both mechanical stimulation and another type of stimulation (e.g., electrical stimulation) to the recipient, such as an electro-acoustic hearing prosthesis. More generally, the techniques presented herein are applicable to any implantable medical device having an implantable actuator an a sound input unit/module with co-located vibration and sound sensors.

It is to be appreciated that the embodiments presented herein are not mutually exclusive and that the various embodiments may be combined with another in any of a number of different manners.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method, comprising:

delivering one or more sets of mechanical stimulation signals to a recipient via an actuator of an implantable auditory prosthesis;

capturing, at a vibration sensor positioned at a first location in the recipient, vibrations induced by each of the one or more sets of the mechanical stimulation signals;

determining a vibrational transfer function between the actuator and the vibration sensor at the first location; and providing a user with an indication of the vibrational transfer function between the actuator and the vibration sensor at the first location.

2. The method of claim 1, wherein delivering the one or more sets of mechanical stimulation signals to the recipient via the actuator, comprises:

delivering the one or more sets of mechanical stimulation signals to a middle ear bone of the recipient.

3. The method of claim 1, wherein delivering the one or more sets of mechanical stimulation signals to the recipient via the actuator, comprises:

delivering the one or more sets of mechanical stimulation signals to an opening in a cochlea of the recipient.

4. The method of claim 1, wherein delivering the one or more sets of mechanical stimulation signals to the recipient via the actuator, comprises:

delivering the one or more sets of mechanical stimulation signals to a skull bone of the recipient.

5. The method of claim 1, wherein the vibration sensor is positioned in a housing configured to be implanted in the recipient, and wherein a microphone is positioned in the housing.

6. The method of claim 1, wherein the actuator is configured to generate each of the one or more sets of mechanical stimulation signals from one or more sets of actuator control signals, and wherein determining the vibrational transfer function between the actuator and the vibration sensor at the first location, comprises:

performing an open-loop measurement of the vibrations induced by each of the one or more sets of the mechanical stimulation signals; and analyzing the vibrations determined via the open-loop measurement relative to the one or more sets of actuator control signals to generate the vibrational transfer function.

7. The method of claim 1, wherein the actuator is configured to generate each of the one or more sets of mechanical stimulation signals from one or more sets of actuator control signals, and wherein determining the vibrational transfer function between the actuator and the vibration sensor at the first location, comprises:

performing a closed-loop measurement to determine a maximum stable gain for use in generating the one or more sets of actuator control signals.

8. The method of claim 1, further comprising:

determining, with one or more processors of the implantable auditory prosthesis, the vibrational transfer function; and sending data representing the vibrational transfer function to an external device.

9. The method of claim 1, further comprising:

sending data representing the vibrations induced by each of the one or more sets of the mechanical stimulation signals to an external device; and determining the vibrational transfer function at the external device.

10. The method of claim 1, wherein the actuator is configured to generate each of the one or more sets of mechanical stimulation signals from one or more sets of actuator control signals, and wherein the method further comprises:

sending data representing the one or more sets of actuator control signals to an external device.

11. The method of claim 1, wherein providing a user with an indication of the vibrational transfer function includes:

displaying a visual representation of the vibrational transfer function to the user.

12. The method of claim 1, wherein providing a user with an indication of the vibrational transfer function includes:

providing the user with an audible representation of the vibrational transfer function via an external device.

13. The method of claim 1, further comprising:

positioning the vibration sensor at a second location in the recipient;

after positioning the vibration sensor at the second location:

delivering one or more sets of mechanical stimulation signals to the recipient via the actuator;

capturing, at the vibration sensor positioned at the second location, vibrations induced by each of the one or more sets of the mechanical stimulation signals;

determining a vibrational transfer function between the actuator and the vibration sensor at the second location; and providing the user with an indication of the vibrational transfer function between the actuator and the vibration sensor at the second location.

14. A method, comprising:

positioning a sound input module comprising a sound sensor and a vibration sensor at a first location in a recipient;

driving an actuator implanted in the recipient with one or more sets of actuator control signals, where each of the one or more sets of actuator control signals causes the actuator to deliver one or more mechanical stimulation signals to the recipient;

capturing, at the vibration sensor, vibrations induced by each of the one or more sets of the mechanical stimulation signals; and analyzing attributes of the one or more sets of actuator control signals relative to attributes of the vibrations induced by each of the one or more sets of the mechanical stimulation signals to evaluate a suitability of the first location for implantation of the sound input module at the first location.

15. The method of claim 14, wherein analyzing attributes of the one or more sets of actuator control signals relative to attributes of the vibrations induced by each of the one or more sets of the mechanical stimulation signals to evaluate a suitability of the first location for implantation of the sound input module at the first location, comprises:

determining a vibrational transfer function between the actuator and the vibration sensor at the first location; and providing a user with an indication of the vibrational transfer function between the actuator and the vibration sensor at the first location.

16. The method of claim 15, wherein determining the vibrational transfer function between the actuator and the vibration sensor at the first location, comprises:

performing an open-loop measurement of the vibrations induced by each of the one or more sets of the mechanical stimulation signals; and analyzing the vibrations determined via the open-loop measurement relative to the one or more sets of actuator control signals to generate the vibrational transfer function.

17. The method of claim 15, wherein determining the vibrational transfer function between the actuator and the vibration sensor at the first location, comprises:

performing a closed-loop measurement to determine a maximum stable gain for use in generating the one or more sets of actuator control signals.

18. The method of claim 15, wherein providing a user with an indication of the vibrational transfer function includes:

displaying a visual representation of the vibrational transfer function to the user.

19. The method of claim 15, wherein providing a user with an indication of the vibrational transfer function includes:

providing the user with an audible representation of the vibrational transfer function via an external device.

20. One or more non-transitory computer readable storage media comprising instructions that, when executed by a processor, cause the processor to:

generate one or more sets of actuator control signals at an implantable auditory prosthesis, wherein the implantable auditory prosthesis comprises an actuator and a sound input module each configured to be implanted in a recipient, wherein the sound input module comprises a sound sensor and a vibration sensor;

provide the one or more sets of actuator control signals to the actuator to deliver, with the actuator, one or more sets of mechanical stimulation signals to the recipient, wherein each of the one or more sets of mechanical stimulation signals are is generated based on at least one of the one or more sets of the actuator control signals;

receive, from the vibration sensor, one or more sets of output signals indicating vibrations detected at the vibration sensor in response to each of the one or more sets of mechanical stimulation signals; and generate, based on the one or more sets of actuator control signals and the one or more sets of output signals, an indication of a relative vibration isolation between the vibration sensor and the actuator.

21. The one or more non-transitory computer readable storage media of claim 20, wherein the instructions operable to generate the one or more sets of actuator control signals comprise instructions operable to:

receive control data from an external device; and generate the one or more sets of actuator control signals from the control data.

22. The one or more non-transitory computer readable storage media of claim 20, wherein the instructions operable to generate the indication of the relative vibration isolation between the acceleration sensor and the actuator comprise instructions operable to:

determine a location-dependent transfer function relating a position of the vibration sensor at a first location to a location of the actuator; and send the location-dependent transfer function to an external device.

* * * * *